Jan. 15, 1924.

G. A. HOLMES

SNAP FASTENER

Filed June 3, 1921

Inventor,
George A. Holmes,
By Joseph R. Lunmore
Att'y.

Patented Jan. 15, 1924.

1,481,203

UNITED STATES PATENT OFFICE.

GEORGE A. HOLMES, OF NEWTON CENTER, MASSACHUSETTS, ASSIGNOR TO UNITED STATES FASTENER COMPANY, A CORPORATION OF MAINE.

SNAP FASTENER.

Application filed June 3, 1921. Serial No. 474,817.

*To all whom it may concern:*

Be it known that I, GEORGE A. HOLMES, a citizen of the United States, and a resident of Newton Center, in the county of Middlesex and State of Massachusetts, have invented an Improvement in Snap Fasteners, of which the following description, in connection with the accompanying drawing, is a specification, like reference characters on the drawing designating like parts.

This invention relates to a snap fastener of the kind now commonly used for fastening vehicle curtains in which the engagement of the stud and socket members is such as positively to resist disengagement by the stresses incident to their holding or fastening function, although the members may readily be separated by a force or pull applied at the proper point.

In the accompanying drawing.

Figure 1:
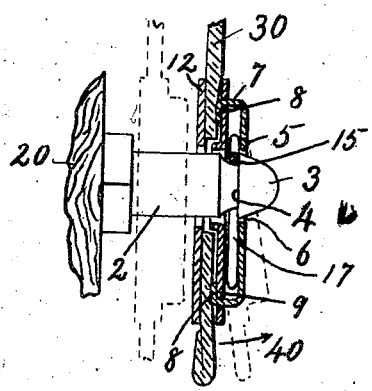
Fig. 1 shows the members in fastening engagement, the socket member being shown in section and the stud in elevation.
Figure 2:
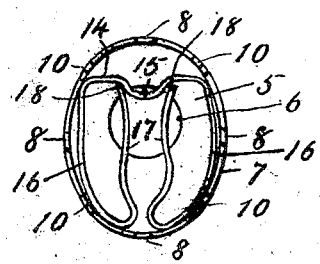
Fig. 2 is a rear elevation of the spring chamber and spring of the socket member, with the rear wall or closure of the spring chamber removed.

The stud member may be of usual construction, having a cylindrical body 2 and a rounded or tapering head 3 separated from the body by a groove or neck such as to afford a substantially square shoulder 4 at the base of the head 3, the stud being shown in Fig. 1 as adapted to be secured to the body 20 of a vehicle although it may be constructed suitably for attachment to a vehicle curtain, or to whatever the part to which the socket member pertains is to be fastened.

The socket member comprises a spring chamber composed of a front plate 5 provided with an aperture 6 for the stud member and having around its margin a flange 7 forming the side wall of the spring chamber, and being provided with projections 8 by which the rear plate 9 is secured to the front and side wall, thus completing the chamber or inclosure for the spring.

The side wall flange 7 also has projecting from the edge thereof longer prongs 10 which extend through holes in the rear plate 9 and may be passed through the fabric or curtain flap 30 and clinched upon a washer plate 12 to secure the socket member to said fabric, there being apertures in the rear spring plate, the fabric, and the washer plate, co-axial with the aperture 6 in the front plate, through which the head and body of the stud may pass.

The spring which is shown as made from a single piece of spring wire is inclosed in the above described spring chamber, and has novel and distinctive features of construction by which the desired functions are performed in co-operation with the stud.

The several parts or sections of the spring are kept in the same plane by the confining influence of the front and rear walls 5 and 9 of the spring chamber, while the side wall 7 serves to maintain the spring in proper position relative to the stud orifice 6 and to support the spring when acted upon by the stud so that it will yield and be strained or bent by the passage of the stud head, instead of being displaced or thrust aside.

The part near the middle of the length of the spring, which will be called the bridge portion, extends across the upper part of the spring chamber having a bearing engagement at its ends with the side wall 7 while at its middle the said bridge portion 14 is bent to form a bulge or convexity 15 which extends beyond the margin of the stud opening 6 of the spring chamber.

Thus in order to permit the entrance of the stud head as shown in Fig. 1 the bulge 15 has to be crowded out by the spring bending action of the bridge portion 14 and as soon as the head 3 has passed the bulge 15 the said bulge snaps into the groove and engages with the shoulder 4 of the stud member.

Figure 3:
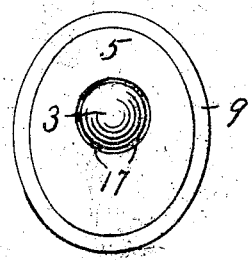
Fig. 3 a front elevation of the complete fastener with the members engaged with one another.

From the ends of the bridge portion 14 the spring extends downward at each side of the spring chamber 5 near the side wall thereof as shown at 16 and from near the lower portion of the spring chamber it extends upward in two terminal branches 17 which are substantially at right angles to the bridge portion and extend across the stud opening 6 so as to be substantially tangential to a small circle concentric therewith, which is approximately the circle bounding the neck of the stud when fastened in the socket as shown in Figs. 1 and 3.

When the stud and socket members are brought together in the operation of fastening, the head 3 of the stud forces the terminal branches 17 of the spring apart until the shoulder 4 passes, when the said branches 17 will spring or snap in against the neck and thus into holding engagement with the shoulder 4 of the stud member.

The spring thus engages under the stud head at three points, two diametrically opposite to one another and the third midway between them, and they act positively to prevent separation of the members by a direct pull in a direction in line with the axis of the stud, while a force or pull in any direction in a plane at right angle to the stud axis is positively withstood by engagement of the stud with the spring chamber at some point around the stud opening 6.

Thus the fastener is positive in its holding and fastening action against any force or pull at a right angle to the stud axis, or whose resultant is in or near the stud axis, these being the forces it has to withstand as an incident to the performance of its function as a fastener.

The members may be unfastened and separated when desired by pulling in the direction of the axis of the stud at a point at or near the periphery of the socket member on the side more remote from the bridge portion 14 of the spring, as indicated by the arrow at 40 in Fig. 1, in which action the bulge 15 of the bridge portion will act as a fulcrum and cause the socket to tilt as indicated in dotted lines, and the periphery of the base of the stud head 3 will have a wedging action to spread the terminal holding branches 17 of the spring so that the stud head can pass between them, thus freeing the socket member sufficiently to permit the disengagement of the portion 15 of the latch spring from the stud head and complete release of the socket member from the stud.

The extremities 18 of the holding branches 17 of the spring are shown as adapted to engage with the sides of the fulcrum projection 15 so as to limit the inward movement of said branches and insure their being in the proper position for co-operation with the stud head.

In some cases two curtain flaps or socket members have to be fastened to the same stud, and in such case the inner one can be pushed back on the shank or body 2 of the stud, as shown in dotted lines in Fig. 1, the three engaging points of the spring all yielding to the wedging action of the inner portion of the neck groove of the stud in this operation.

I claim:

1. A stud and socket fastener comprising a stud member having a convex head and an annular shoulder at the base thereof; and a socket member comprising a spring chamber composed of front and rear plates having apertures constituting a passage for the reception of the stud, and a side wall inclosing the space between said plates, combined with a spring comprising a bridge portion extending across the upper part of the spring chamber the middle part of which projects into said stud passage, and two holding branches extending across said stud passage substantially at right angles to the bridge portion, adapted to engage under the stud head at diametrically opposite points, said holding branches only, being adapted to yield in the unfastening operation.

2. A socket member of a stud and socket fastener consisting of a spring chamber composed of front and rear plates having apertures constituting a passage for the stud, and a side wall inclosing the space between said plates; combined with a spring comprising a bridge portion extending across the upper part of the spring chamber, and two terminal portions extending upward from the lower part of the spring chamber across the stud passage, said bridge portion having at its middle a bulge projecting into the stud passage, and the extremities of the terminal portions being adapted to engage with said bulge of the bridge portion.

GEORGE A. HOLMES.